May 1, 1956  I. GINSBERG  2,743,937
CONVERTIBLE STROLLER
Filed July 26, 1954  3 Sheets-Sheet 2
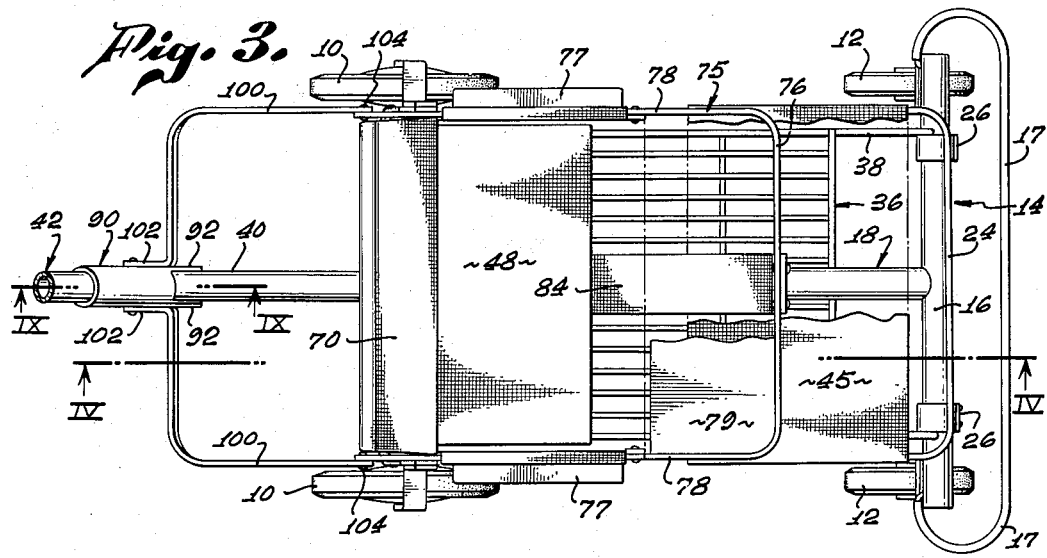
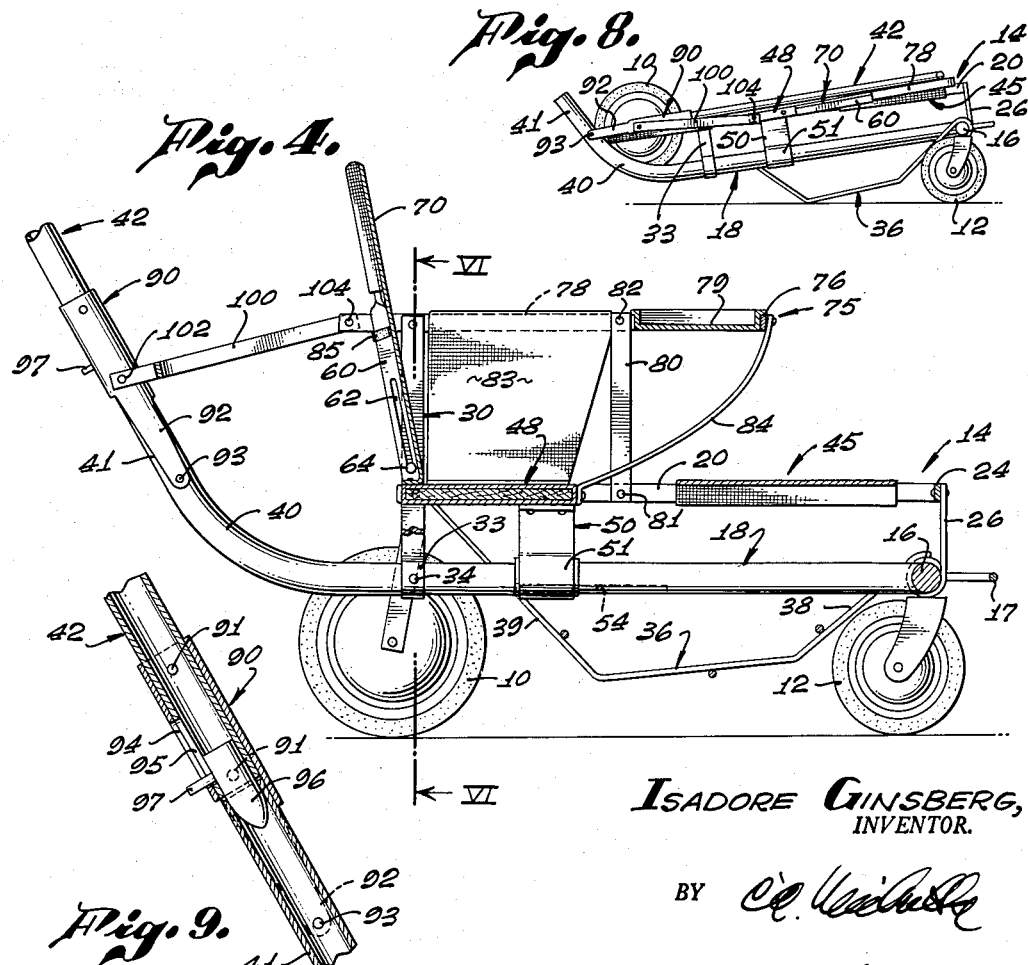
ISADORE GINSBERG,
INVENTOR.
BY
ATTORNEY.

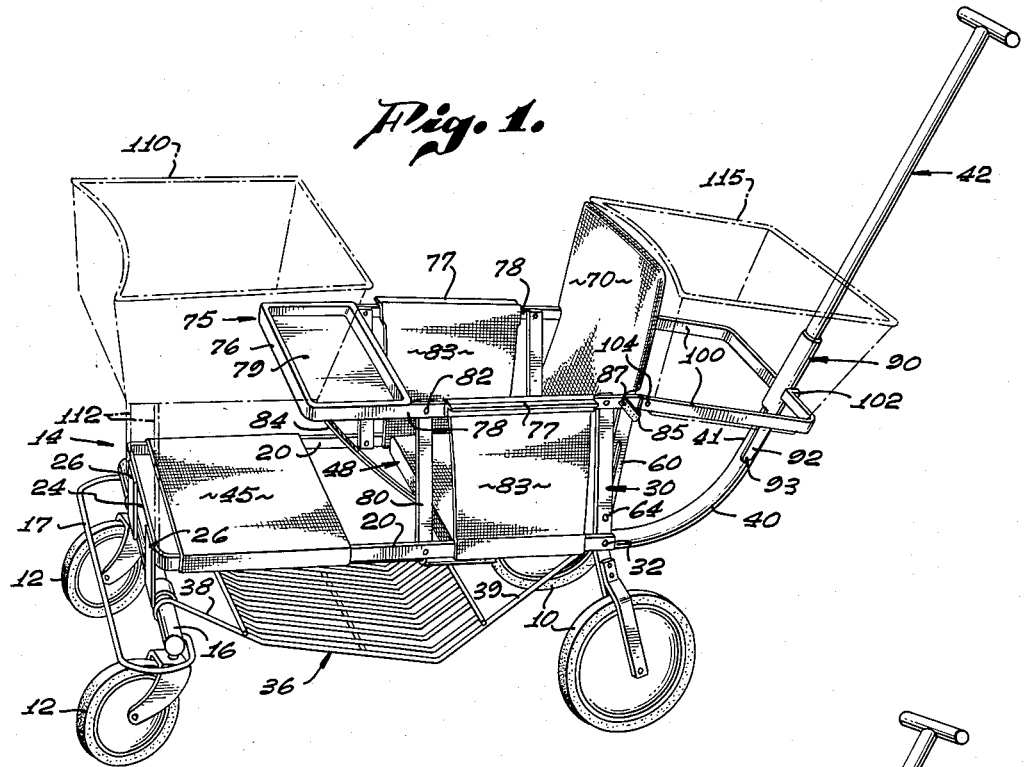

May 1, 1956      I. GINSBERG      2,743,937
CONVERTIBLE STROLLER
Filed July 26, 1954      3 Sheets-Sheet 3
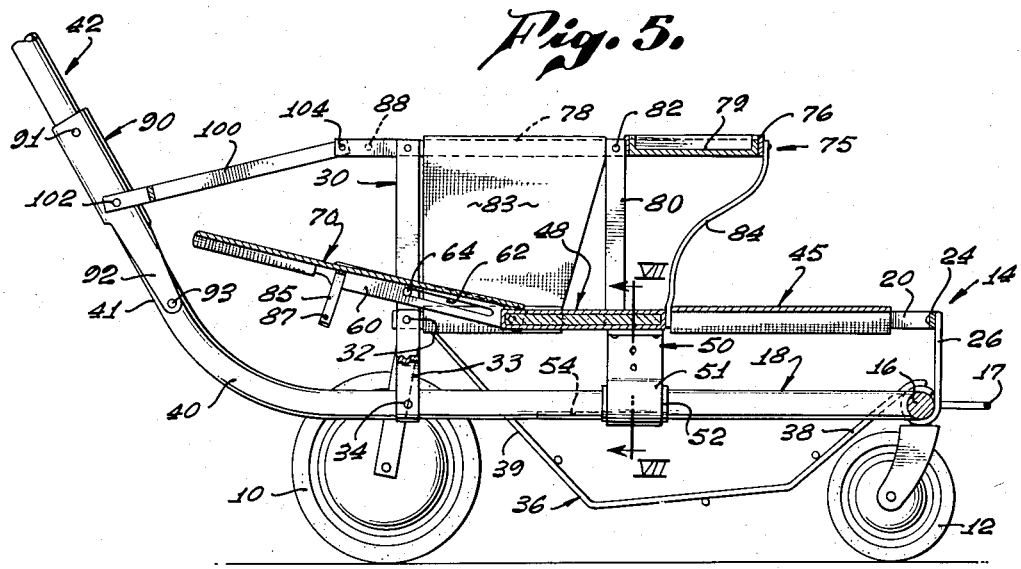
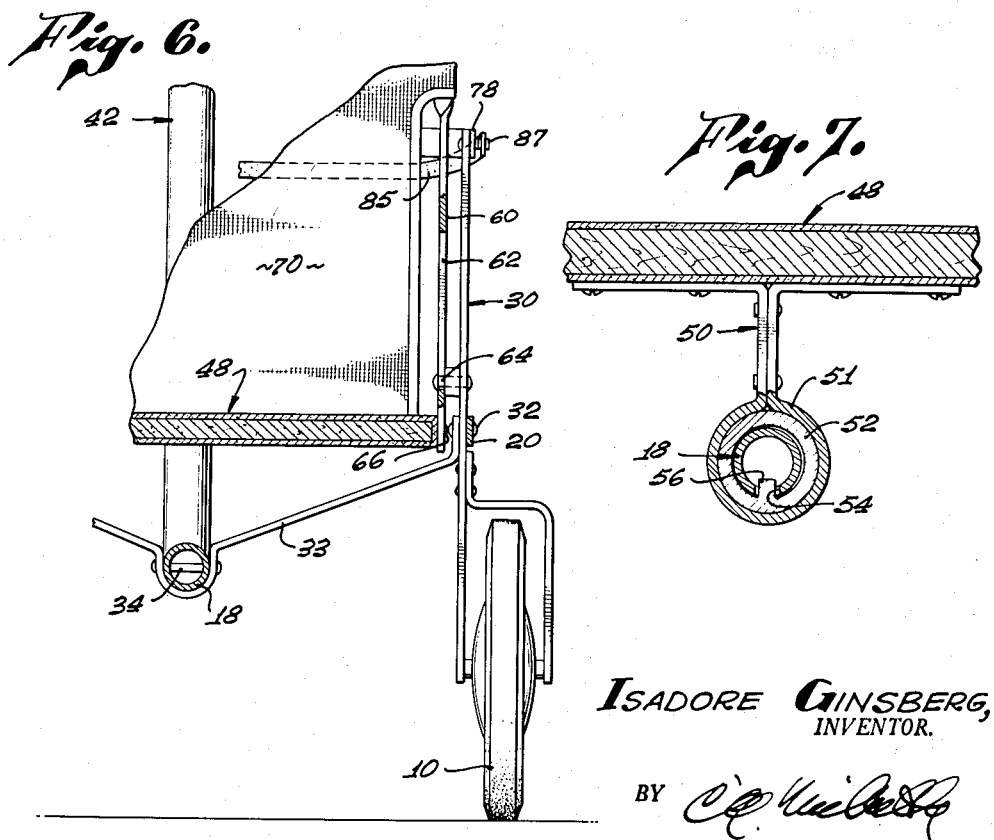
ISADORE GINSBERG,
INVENTOR.
BY
ATTORNEY.

United States Patent Office 2,743,937
Patented May 1, 1956

2,743,937

CONVERTIBLE STROLLER

Isadore Ginsberg, Los Angeles, Calif.

Application July 26, 1954, Serial No. 445,665

8 Claims. (Cl. 280—41)

This invention relates generally to a stroller for children and particularly describes a device of this character which is conveniently collapsible to permit easy portability thereof and which is also convertible whereby to support a child in either a sitting up or lying down position.

The preferred embodiment of the invention herein disclosed includes a sub-structure or chassis equipped with conventional running gear including front and rear pairs of ground-engaging wheels, the front wheels being preferably caster-mounted. The chassis is provided with a central longitudinal member on which the seat of the vehicle is slidably mounted. A back is hingedly attached to the rear of the seat, and is arranged to extend and be supported substantially vertically when the seat is in its rearward position on the longitudinal member, and to lie substantially horizontally when the seat is in its forward position on the longitudinal member. A flat rectangular leg rest is disposed in horizontal alignment with the seat, and the seat in its forward position contacts the rear edge of the leg rest. As a result, with the seat in forward position, the back, seat and leg rest constitute a bed extending the length of the vehicle and adapted to support an infant's body. Means are provided to prevent the infant from sliding or falling from the bed so made.

When the seat is in its rearward position, the back being upright, an infant may sit upon the seat in normal sitting position and a removable foot support platform is provided beneath the seat to prevent the infant from dragging his feet upon the ground. Furthermore, with the infant removed, the entire device may be foldingly collapsed into compact form for convenience in storage, loading into an automobile and similar purposes. Folding into collapsed position is accomplished by releasing a locking latch on an articulated rear handle projecting upwardly and rearwardly from the chassis.

In addition to the above characteristics, the present stroller provides a small tray above and forwardly of the seat for the child or infant to use for playthings, and there is also provision for supporting one or more baskets by which the user of the stroller may transport items such as groceries or the like.

An object of the present invention is therefore to provide a novel, collapsible, convertible stroller.

Another object of the invention is to disclose a device of the above character including a longitudinally slidable seat with attached hinged back by which to convert the device from a chair to a bed for an infant.

A further object is to disclose a stroller convertible to support an infant in either sitting up or lying down position including flexible means extending between the infant's legs to prevent him from slipping or squirming downwardly or outwardly from the device.

Another object of the invention is to disclose apparatus of the above character of unusual economy of construction and reliability of operation.

These and other and allied objects and purposes of the invention wil become clear from a study of the following description of a preferred embodiment thereof taken in connection with the accompanying drawings in which:

Fig. 1 is a perspective view of a stroller embodying the present invention with the seat and back in upright position; two baskets are shown in dotted outline mounted on the stroller.

Fig. 2 is a perspective view of the device shown in Fig. 1 wherein the seat has been moved forwardly and the back has been hinged downwardly in order to provide a bed; the two baskets are shown nested in dotted outline.

Fig. 3 is a top plan view of the stroller with the seat and back in sitting position as shown in Fig. 1, portions of the tray and leg rest being broken away in order to show the parts therebelow, and with the major length of the handle removed.

Fig. 4 is a vertical sectional view taken on line IV—IV of Fig. 3.

Fig. 5 is a sectional view similar to that of Fig. 4 except that the seat and back are shown converted to form a bed.

Fig. 6 is a fragmentary sectional view taken on lines VI—VI of Fig. 4.

Fig. 7 is a fragmentary sectional view taken on line VII—VII of Fig. 5.

Fig. 8 is a side view on a small scale of the stroller in collapsed position.

Fig. 9 is a fragmentary sectional view taken on line IX—IX of Fig. 3 showing details of a preferred means for hingedly attaching the propelling handle to the device and for locking the handle in operative position.

As appears generally in Figs. 1 and 2, the stroller of the present invention includes rear wheels 10 and front caster wheels 12, supporting a chassis or substructure made up of a substantially rectangular lower frame indicated generally at 14, a transverse crossbar 16, and a centrally disposed longitudinal rod 18 (see Figs. 4 and 6) connected to the crossbar 16 and extending rearwardly therefrom. This central rod or bar is preferably tubular. The frame 14 includes a pair of spaced parallel side members 20 and a transverse front yoke 24, the yoke and side members 20 being preferably integrally formed of metal strap. The front yoke portion 24 is supported upon the crossbar 16 by a pair of vertically extending brackets 26. The caster wheels 12 are pivotally mounted at opposite ends of the crossbar 16 and serve to support the front end of the stroller, and a bumper 17 is connected to the crossbar 16 and extends forwardly thereof. At the rear end of the side members 20 vertical arms 30 are pivotally connected substantially centrally of their length at 32 and the rear wheels 10 are mounted upon the lower ends of the vertical arms 30 to support the rear end of the stroller. Desirably the lower portions of the arms 30 are inclined somewhat rearwardly as shown in order that the rear wheels 10 are more compactly collapsed when the device is moved to the position shown in Fig. 8. Rear support of the chassis is provided by the yoke member 33 extending transversely of the chassis between the pivot points 32 and fixed at its center to the tubular rod 18 by suitable means 34.

There may also be provided a lower platform indicated generally at 36 upon which a child may rest his feet when in a sitting position in the stroller. The platform 36 is provided with forwardly extending arms 38 adapted to hook over and be supported by the crossbar 16, and by rearwardly extending arms 39 removably connected to the side members 20 as by the upper rear ends of arms 39 resting upon and supported by the tips of the upturned ends of the yoke member 33 fastened to the side members 20. The central rod or bar 18 preferably includes an upwardy and rearwardly extending arcuately shaped portion 40, and a handle indicated generally at 42 is connected to the upper end 41 of the arcuate extension 40 by suitable lockable pivot means referred to in detail hereinafter.

A leg rest indicated generally at 45 and desirably made of pliant fabric material or the like is provided at the forward end of the lower frame 14 and is attached to and extends between the side members 20 of the frame. A seat indicated generally at 48 is made of lightweight rigid material, preferably wood, and is disposed in horizontal alignment with the leg rest 45. The seat rests upon a support bracket indicated generally at 50 (see Fig. 7) which terminates downwardly in an arcuate portion 51 fixed to a collar or sleeve 52 adapted to encircle the central tubular bar 18. Means are provided to insure that the seat bracket 50 and the collar 52 do not rotate upon the bar 18, and such means are here shown as including a longitudinal slot 54 formed in the rod 18 and an inwardly projecting key or tongue 56 carried by the collar 52 and slidably received in the slot 54.

Back support means are provided for an infant seated in the present stroller. Such means are here shown as including spaced parallel back members 60, in the lower portion of which are provided longitudinally extending slots 62. The slots 62 are adapted to slidingly and rotatably engage horizontally disposed inwardly projecting pins 64 fixed to the vertical arms 30 adjacent the points of pivotal connection 32 between the vertical arms 30 and the side frame members 20. The back members 60 are pivotally attached at 66 to the rear of the side edges of the seat 48, and the back includes a preferably flexible member such as fabric or the like indicated generally at 70 having its sides attached to the back members 60 and desirably extending downwardly and forwardly to cover the seat 48.

An upper frame indicated generally at 75 includes a front transverse yoke 76 and preferably integrally formed parallel side arms 78. Arm rests 77 are fixed to the side arms 78. The upper frame 75 is connected to the lower frame 14 by suitable linkage means to be now described, such that the upper frame 75 is maintained at all times in parallel relationship with the lower frame 14. The connecting linkage means include the upper portions of the arms 30, as well as the links 80 which are pivotally connected at their lower ends 81 to the side members 20 and at their upper ends 82 to side arms 78. Desirably, the upper frame 75 includes at its front end a small tray 79 for the infant to use in playing with toys. Vertical side walls 83 of flexible fabric are attached to side arms 78 and side members 20. A flexible central strap 84 is fixed at its upper end to the center of front yoke 76 and at its lower end to the center of the front edge of seat 48. This strap extends between the legs of an infant in the stroller, whether sitting up or lying down, and thus prevents the infant from falling, rolling or squirming out of the stroller. Means are provided for maintaining the back 70 in upright position as seen in Fig. 4. Such means may include a narrow fabric strap 85 attached to the back 70 and extending transversely thereacross. The ends of the strap are equipped with suitable means such as snap fasteners 87 which are selectively attachable to complementary elements 88 fixed to the side arms 78.

The handle 42 is pivotally connected to the rear upper end portion 41 of the arcuate extension 40 of the rod 18 by latch means such as those illustratively shown in Fig. 9. As there appears, a sleeve indicated generally at 90 encircles the lower end of handle 42 and is fixed thereto by suitable fastening means 91. The sleeve 90 includes a downwardly extending bifurcated pair of leg members 92 whose lower ends are pivoted at 93 to the tubular portion 41. In the upper part of the sleeve 90 there is provided a longitudinally extending slot 94, and a similar slot 95 is formed in the handle member 42 in alignment with the slot 94. A movable latch member 96 is slidable within the lower end of the tubular handle 42 between limits of travel established by an outwardly projecting pin 97 slidable in the aligned slots 94 and 95 and serving also as a finger grip handle by which the user may move the latch member 96 upwardly or downwardly within the lower end of the handle 42. The lower end of the latch member 96 is preferably tapered as shown to facilitate its entrance into the upper end of the tubular member 41. When so received, the member 41 and the handle 42 are locked against relative movement. The latch member 96 may be digitally withdrawn upwardly by means of the pin 97 in order to unlock the members 41 and 42 and permit rotation of the handle 42 forwardly about pivots 93.

Means are provided for collapsing the upper frame 75 against the lower frame 14 simultaneously with the forward rotation of the handle 42 just mentioned. Such means are here shown as including arms 100 pivotally connected at their rear ends 102 to the collar 90 and at their front ends pivotally connected at 104 to the rear ends of the side members 78 of the upper frame 75. Thus, rightward folding movement of the handle 42 as seen in Fig. 4 collapses the entire structure into the position shown in Fig. 8. During this movement the arms 30 and links 80 are rotated forwardly about their pivotal connections 32 and 81 respectively with the lower side members 20, and the back members 60 similarly rotate forwardly about their pivotal connections 66 with seat 48, which remains substantially fixed relative to the chassis. Pivotal rotation of the arms 30 also causes rear wheels 10 to be moved rearwardly and upwardly into the position shown in Fig. 8. The foot rest platform 36 may be removed in order to attain even greater compactness when the device is collapsed.

When the stroller is operative as shown in Fig. 1 or 2, baskets may be mounted thereon for convenience in transporting items. A front basket 110 includes downwardly extending legs 112 adapted to be removably hooked to and to rest upon the front yoke portion 24 of the lower frame 14. The rear edge of the basket 110 may rest upon yoke 76 and tray 79 and may be hooked thereto if desired. A rear basket 115 is adapted to be received in the generally rectangular area defined by the arms 100 and the back 70, and is desirably tapered in outline as shown in order to fit snugly but removably into such area. The rear basket 115 may be formed to nest with front basket 110 if desired, as shown in Fig. 2.

Modifications and changes from the specific forms of the component parts of the invention as herein disclosed will occur to those skilled in the art. Such changes not departing from the spirit of the invention are intended to be embraced within the scope of the appended claims.

I claim:

1. A stroller comprising: a substantially rectangular sub-structure having a pair of supporting front wheels mounted thereon and a pair of arms pivotally connected to the rear corners of the sub-structure, the arms having a pair of supporting rear wheels mounted on their lower ends and extending vertically above the sub-structure, the sub-structure including a longitudinally extending central bar disposed below the pivotal connections of said arms; a horizontally disposed seat including a supporting bracket slidably carried on said central bar; a back hingedly connected to the seat for folding from a substantially upright vertical position to a substantially horizontal position, the back being slidably connected to said arms at points spaced slightly above said pivotal connections; and means for detachably attaching the back to said arms at points spaced above said points of slidable connection.

2. A stroller comprising: a chassis including a horizontally disposed lower frame having spaced parallel side members and a transverse front yoke joining the side members, a central longitudinal rod below the frame and disposed parallel to the side members, and a transverse cross-bar fixed to the front end of the rod and to the yoke and disposed below the latter; running gear including front caster wheels mounted at ends of the cross-bar, vertical arms pivoted to the rear ends of the slide members and extending thereabove and therebelow, and rear wheels mounted on the lower ends of the arms; a horizontally disposed seat above said central rod and slidable forwardly and rearwardly thereon, the seat being virtually coplanar with the side members; and a back hinged to the rear of the seat and swingable from a substantially vertical upright position to a substantially horizontal lying-down position extending rearwardly from the seat, the back being slidably connected to said arms adjacent the pivotal connections with the side members and including hook means for selective attachment to the arms at points spaced above the pivotal connections.

3. The invention as stated in claim 2 including a horizontally disposed leg rest extending between and carried by said side members, the leg rest being coplanar with and forward of said seat and juxtaposed therewith when the latter is in its forward position.

4. A child's stroller comprising: a chassis including a generally rectangular frame having supporting wheels mounted on the front thereof, a pair of support arms centrally pivoted to the rear of the frame about a horizontal axis and provided with rear supporting wheels on their lower ends, and a horizontally disposed longitudinally extending, central bar below said frame; a seat slidably mounted on said bar for longitudinal movement thereon; a back hingedly attached to the seat and movable from an upright position when the seat is rearward on said bar to a substantially horizontal position when the seat is forward on said bar, the back being in slidable engagement with the support arms adjacent said axis and including means for selective attachment to upper portions of the support arms when the back is in upright position.

5. The invention as stated in claim 4 including upper horizontal side arms pivotally connected adjacent their rear ends with the upper ends of the support arms and a pair of links paralleling the support arms and disposed forwardly thereof, the links extending between and pivotally connecting the side arms and frame.

6. The invention as stated in claim 5 including a rearwardly and upwardly extending handle pivotally connected to the chassis for swinging about an axis paralleling the first named axis and linkage means pivotally connecting the handle and the upper side arms.

7. A stroller comprising: a chassis including a pair of laterally spaced horizontal frame members, a longitudinal bar disposed beneath the plane of the frame members and parallel thereto, a pair of support wheels connected to one end of the chassis, a pair of laterally spaced support arms centrally pivoted about horizontal axes to the other end of the chassis, and a second pair of support wheels carried by lower ends of the support arms; a seat mounted upon said bar for slidable longitudinal movement in said plane; a back hingedly connected to the seat; and selectively connectable means for maintaining the back in upright position virtually normal to said plane.

8. The invention as stated in claim 7 including horizontally disposed leg rest means in said plane carried by the frame members.

References Cited in the file of this patent

UNITED STATES PATENTS

| | | |
|---|---|---|
| 2,409,316 | Rogers | Oct. 15, 1946 |
| 2,535,138 | Johnson | Dec. 26, 1950 |